(12) United States Patent
Ratte

(10) Patent No.: US 6,684,935 B2
(45) Date of Patent: Feb. 3, 2004

(54) INTENSIFICATION THROUGH DISPLACEMENT OF A COACTING MOLD MEMBER

(75) Inventor: Robert W. Ratte, North Oaks, MN (US)

(73) Assignee: Water Gremlin Company, White Bear, MN (US)

( * ) Notice: Subject to any disclaimer, the term of this patent is extended or adjusted under 35 U.S.C. 154(b) by 0 days.

(21) Appl. No.: 10/200,323

(22) Filed: Jul. 23, 2002

(65) Prior Publication Data
US 2003/0034144 A1 Feb. 20, 2003

Related U.S. Application Data
(60) Provisional application No. 60/312,973, filed on Aug. 17, 2001.

(51) Int. Cl.[7] .............................. B22D 17/04; B22C 9/00
(52) U.S. Cl. ....................... 164/120; 164/113; 164/319; 164/320; 164/339
(58) Field of Search ................................ 164/120, 113, 164/319, 320, 339

(56) References Cited

U.S. PATENT DOCUMENTS 6,513,570 B2 * 2/2003 Ratte .......................... 164/312

* cited by examiner

Primary Examiner—Tom Dunn
Assistant Examiner—I-H. Lin
(74) Attorney, Agent, or Firm—Jacobson and Johnson

(57) ABSTRACT

An apparatus and method for pressure casting a battery part wherein at least one of the mold members forming the surfaces of an internal battery part cavity are displaced with respect to one another to reduce the volume of the mold cavity formed between the two parts to thereby intensify the pressure sufficiently high pressure so as to inhibit the formation of cracks and tears in a cast part.

14 Claims, 9 Drawing Sheets

INTENSIFICATION THROUGH DISPLACEMENT OF A COACTING MOLD MEMBER

CROSS REFERENCE TO RELATED APPLICATIONS

This application claims priority from provisional application Ser. No. 60/312,973 titled Apparatus and Method for Making Battery Parts filed Aug. 17, 2001.

FIELD OF THE INVENTION

This invention relates generally to pressure intensification casting of battery parts and, more specifically to pressure casting of lead or lead alloy battery terminals to inhibit the formation of cracks and tears in the battery part by displacing a coacting internal movable mold member with respect to a further mold member with the coacting internal movable mold member and the further mold member coactively defining a battery part cavity.

STATEMENT REGARDING FEDERALLY SPONSORED RESEARCH OR DEVELOPMENT

None

REFERENCE TO A MICROFICHE APPENDIX

None

FIELD OF THE INVENTION

Background of the Invention

Battery parts such as terminals, which are typically made of lead or a lead alloy, are usually cold formed in order to produce a battery terminal that is free of voids and cracks. If lead or lead alloy battery terminals are pressure cast, air is left in the battery terminal cavity in the mold so that as the lead solidifies, the air bubbles prevent the battery terminal from cracking. That is, the air bubbles act as fillers so the lead remains distributed in a relatively uniform manner throughout the battery terminal. Unfortunately, air bubbles within the battery terminals cause the battery terminals to be rejects as the air bubbles can produce large voids in the battery terminal. In order to minimize the air bubbles in the battery terminal, a vacuum can be drawn in the battery terminal cavity mold; however, although the vacuum removes air from the mold and inhibits the forming of air bubbles in the battery terminal, the battery terminals cast with a vacuum in the battery terminal cavity oftentimes solidify in an uneven manner producing battery terminals with cracks or tears which make the battery terminals unacceptable for use. The present invention provides a method and apparatus for forming a battery part during a pressure casting part through volume shrinkage of the mold cavity through displacement of at least one of mold members that form the internal finished mold cavity.

In one embodiment of the invention, a battery terminal is cast which is substantially free of cracks and tears by pressure casting a lead alloy while a vacuum is being applied to the battery terminal cavity. At the moment when the lead in the battery terminal cavity reaches the liquid-to-solid transformation stage the displaceable mold member can be displaced to reduce the volume of the mold for solidification. By precisely controlling the time of application of an external compression force to the molten lead in the battery terminal cavity, and consequently, the time at which the volume of the battery terminal cavity is reduced, one can force the molten lead or lead alloy in the flowable state into a smaller volume where the pressure on the battery terminal cavity is maintained. By maintaining the pressure on the battery terminal cavity during the solidification process, the battery terminal can be cast in a form that is free of cracks and tears.

In another embodiment of the invention, the mold for forming the pressure cast battery part is sealed off while the molten lead is still in the molten state and before the molten lead can begin to solidify the supply of pressurized lead is shut off and at the same time the internal pressure of the molten lead is increased by displacing at least one of the mold members to reduce the volume of the mold cavity for the molten metal. This process is suited for those applications where the entire mold can withstand the higher pressures. That is, when the liquid metal is in a molten state an increase in pressure of the molten lead throughout the mold and the maintaining of the increased pressure during solidification can produce a battery part free of tears and cracks. This process allows one to obtain greater molding pressure than is available with conventional pressure casting techniques.

In another embodiment of the invention, the cast battery part is subjected to at least a partial cold forming during the volume contraction step by rapidly displacing one of the mold members to reduce the volume of the mold with sufficient force to cold form a portion of the lead in the battery part to thereby produce a battery part that is free of cracks and tears. This method is more suitable for those battery parts where one does not want to subject the mold to excessively higher pressures than the die casting pressures.

SUMMARY OF THE INVENTION

Briefly, the system comprises an apparatus and method for pressure casting a battery part wherein at least one of the mold members are displaced with respect to another to reduce the volume of the internal mold cavity to thereby intensify the pressure of the battery part during the molding process to thereby inhibit the formation of tears and cracks in the battery part.

DESCRIPTION OF THE PREFERRED EMBODIMENT

Figure 13:
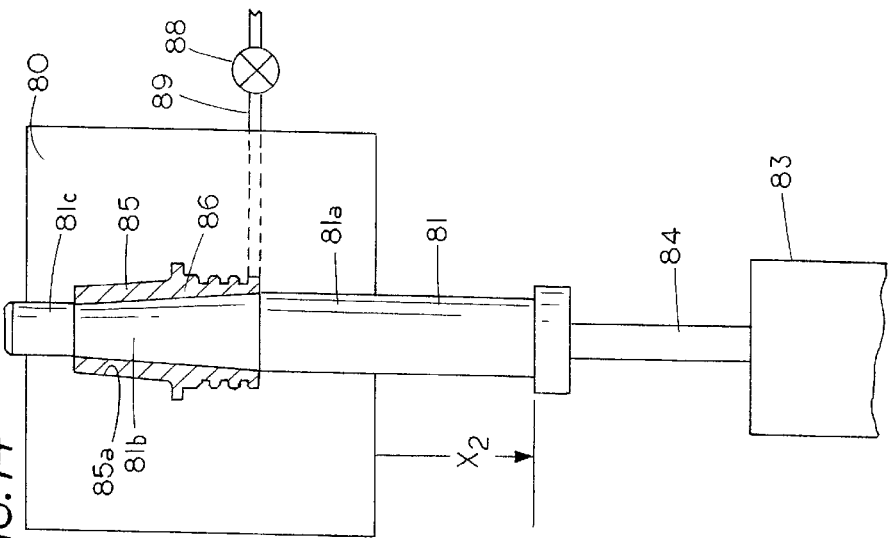
FIG. 13 is a side sectional view of a mold with a moveable core member positioned in the mold to form a portion of a cavity of a first volume.
Figure 14:
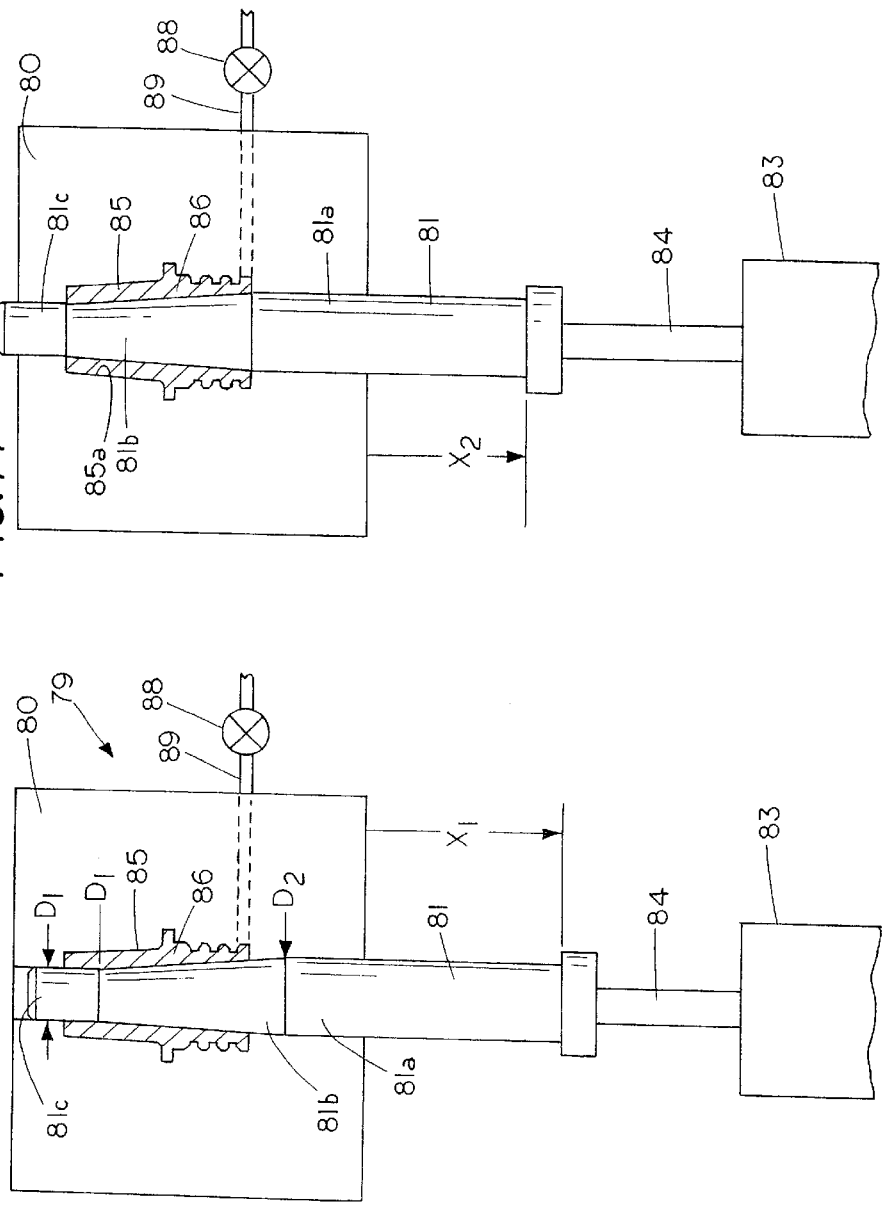
FIG. 14 is a side view of a mold of FIG. 13 with the movable core member positioned in the mold to form a cavity of a second reduced volume through displacement of the mold members.

The concept of pressure intensification wherein a piston is driven into the mold or a runner under various conditions is illustrated in FIGS. 1–12. In contrast to the external driven piston method and apparatus of FIGS. 1–12, the present invention and method, the mold includes at least one movable mold member with the movable mold member being an internal mold member that partially defines the mold cavity of the finished part. This feature utilizing a displaceable mold part is illustrated in FIGS. 13 and 14, which shows a two part mold having a fixed mold member and a displaceable mold member that extends through the mold cavity in the fixed mold member to form an integral and substantial portion of the finished surface of the mold cavity. Thus in the embodiment of FIGS. 13 and 14 one intensifies by displaying the internal finished mold surfaces with respect to one another while in the embodiments of FIGS. 1–12 one intensifies by externally directing a piston into the metal in the mold cavity. FIGS. 1–12 illustrate various apparatus and method for intensification using a piston, such as removal of air from the mold cavity, flow shut off mechanism as well as monitoring systems. It should be understood that such features shown in FIGS. 1–12 in conjunction with an external driven piston can also be used with the present invention having a displaceable mold member.

Figure 1:
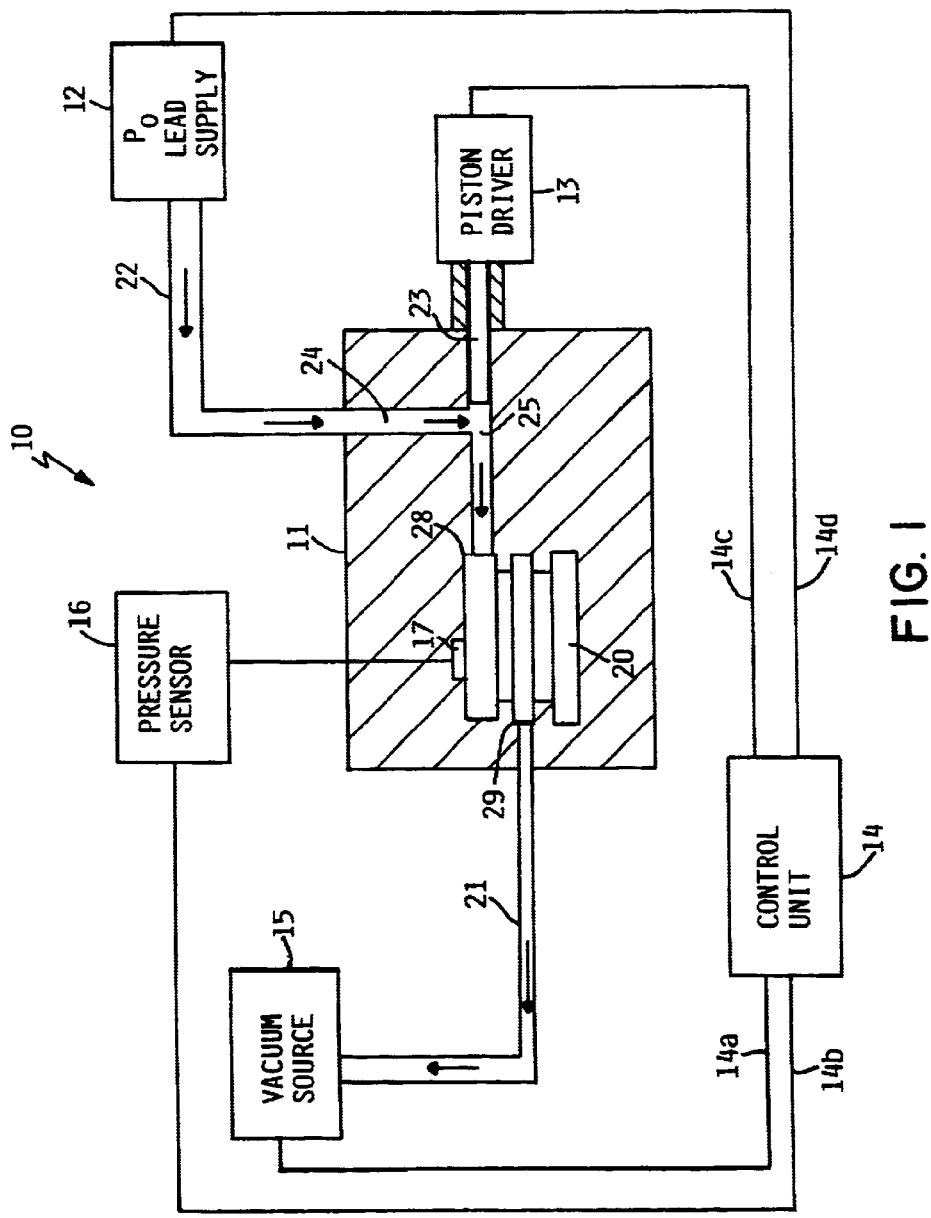
FIG. 1 is a partial schematic of a system for pressure casting of a battery terminal to inhibit the cracking or tearing of the battery terminal during the solidification process where a piston is driven into the mold to decrease the volume of the mold.

To appreciate the general concept of pressure intensification of battery parts a reference should be made to FIGS. 1–12. Referring to FIG. 1, reference numeral 10 generally identifies a system for pressure casting of a battery terminal or battery part to inhibit formation of cracks and tears in the pressure cast battery terminal or battery part with use of an external piston. The system 10 includes a source of pressurized molten lead 12 (which could be a source of pressurized alloy of lead) for directing molten lead under pressure into a mold 11. Mold 11 has a battery terminal cavity 20 located therein with a runner 24 extending therefrom for supplying molten pressurized lead from pressurized lead source 12 to battery terminal cavity 20.

System 10 includes a vacuum source 15 which is connected to a cold spot i.e. a spot that cools at a rapid rate and cools before the rest of the molten metal in the battery terminal cavity 20. This enables the vacuum source 15 to evacuate the air from battery terminal cavity 20 through passage 21 prior to supplying molten lead to the battery terminal cavity 20.

System 10 also includes a pressure sensor 16 having a probe 17 mounted in mold 11 with probe 17 mounted in position to form a portion of the mold surface surrounding the battery terminal cavity 20. Pressure sensor probe 17 is preferably placed in a hot spot of the mold, i.e. a spot that cools at a slower rate. By placing the probe 17 in a portion of the mold that remains in a liquid state, one can monitor the pressure of the molten lead in the liquid state as the molten lead is supplied to battery terminal cavity 20.

Located in an slideable relationship in passage 25, which is external to the cavity, is a cylindrical piston 23 for driving into runner passage 25 of mold 11. A piston driver 13, which carries piston 23 connects to mold 11 to hold piston 23 in an out of the way condition as molten lead is being forced into battery terminal cavity 20. Piston 23 provides a mechanical means for reducing the volume available for solidification of the lead therein. In this embodiment a member external to the mold is driven into the mold to reduce the volume of the mold and hence increase the pressure of the lead in the mold cavity.

In order to control the operation of system 10, a control unit 14 is included with system 10. Control unit 14 connects to vacuum source 15 via electrical lead 14a and to pressure sensor 16 via electrical lead 14b. Similarly, control unit 14 connects to molten lead supply 12 through electrical lead 14d and to piston driver 13 through electrical lead 14c.

The control unit 14, which can be a computer with appropriate software, receives signals from pressure sensor 16, which transmits the pressure of the molten lead in battery terminal cavity 20. That is, as the molten lead from the pressurized lead source 12 fills the battery terminal cavity 20, the pressure on probe 17 is continually transmitted to pressure sensor 16 and onward to control unit 14. When the pressure in battery terminal cavity 20 reaches a predetermined level, control unit 14 sends a signal to piston driver 13 through electrical lead 14c which quickly drives piston 23 into passage 25 to simultaneously cutoff and seal passage 25 to prevent continued lead flow from runner 24. As piston 23 plunges into the passage, it reduces the volume for the lead that is in the liquid-to-solid transformation stage. By reducing the volume of the lead during the liquid-to-solid transformation stage, one can compensate for the lead shrinking and contracting as the molten lead solidifies. Consequently, the finished cast product is free of the tears and cracks that would have a detrimental effect on the performance of the battery terminal.

The system of FIG. 1 is described with respect to volume shrinkage during the liquid-to-solid transformation stage; however, the system of FIG. 1 can also be used with the method of volume shrinkage when the molten lead is in the molten state. If the pressure of the molten lead is to be increased the vacuum source connected to the mold is sealed off while the lead is in the molten state. This leaves a closed mold with liquid molten metal having substantially the same pressure throughout the mold. Next, with the pressure of the molten lead being maintained by the source of pressurized lead 22 a piston 23 is driven inward to simultaneously shut off the supply of further molten lead while at the same time substantially increasing the liquid pressure throughout the mold. By increasing the pressure of the molten lead sufficiently the molten lead can solidify into a part free of cracks and tears. This process may not be used with all types of molds as it may not be feasible to build a mold to withstand the required high pressures throughout the mold. The required pressure of the molten lead to achieve a battery part free of cracks and tears will to a certain extend depend on the shape of the battery part and can be readily determined through trial and error.

Figure 2:
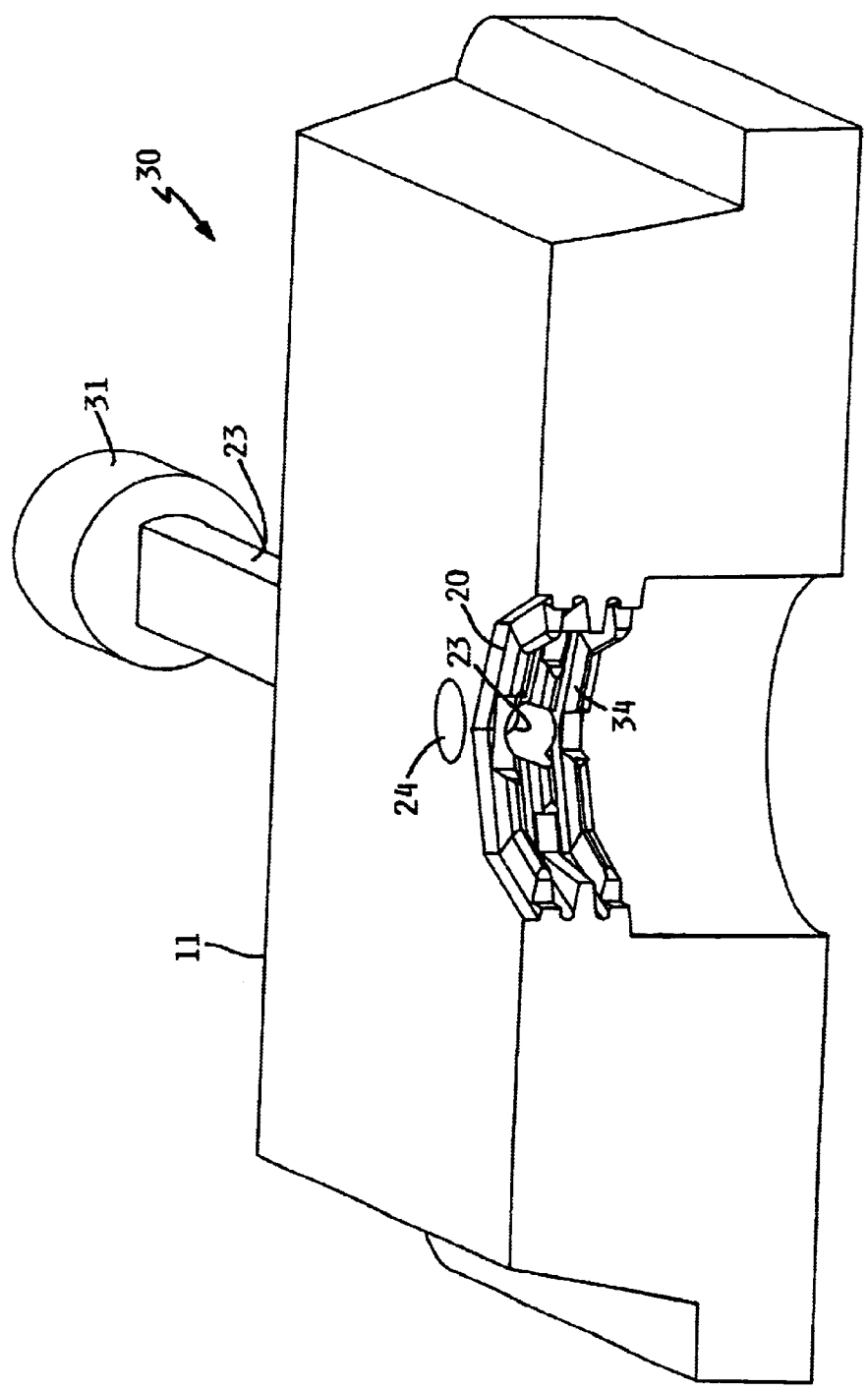
FIG. 2 is a diagram showing a portion of the mold and the piston that is driven into the runner of the mold.

Referring to FIG. 2, mold 11 has been opened to reveal a portion of mold 11 and piston 23 which are shown in perspective view in relation to a portion of battery terminal cavity 20. Extending out of one side of mold 11 is piston 23 having a head 31 for engagement with a hydraulic cylinder or the like. Battery terminal cavity 20 is defined by a set of radial fins 34 that project into the battery terminal cavity 20.

With system 10 one can pressure cast a lead battery terminal to inhibit formation of tears and cracks in the battery terminal. In order to inhibit the formation of tears and cracks in the cast battery terminal, the state of molten lead is continuously monitored so that when the molten lead enters the liquid-to-solid transformation stage, the volume of the mold available for the lead to solidify therein can be quickly reduced to force the lead, while it is still flowable, into the smaller volume. By rapidly reducing the volume and maintaining pressure on the molten lead during the critical liquid-to-solid transformation stage, one causes the molten lead to solidify as a solid terminal or battery part substantially free of tears and cracks. It should be pointed out that in the liquid-to-solid transformation stage, the lead is in a condition where it can flow and is sometimes referred to as a "mush". Normally, as the molten lead goes through the liquid-to-solid transformation stage, the volume of lead contracts which results in a finished product that will have cracks or tears when it is completely solidified. The step of volume contraction at the moment when the lead is in the liquid-to-solid transformation stage produces a battery part when cooled that is substantially free of cracks and tears. This procedure is particularly useful where the battery cavity may have an unusual shape as the pressure produced by volume contraction can be transmitted throughout the part to produce sufficient pressure to prevent the formation of cracks and tears in the battery part.

Referring to FIG. 1 to illustrate the operation of system 10, the mold 11 is assembled with the battery terminal cavity 20 located within the mold. One end of a vacuum conduit 21 is attached to vacuum source 15, and the other end of vacuum conduit 21 is attached to a location on the mold 11 which is referred to as a "cold spot". That is, the lead in this portion of the mold is referred to as a "cold spot" as the molten lead in this region will solidify sooner than the molten lead being fed into the mold through runner passage 25. Consequently, as the lead begins to solidify in the "cold spot" the solidified lead immediately closes the end of conduit 21 which prevents molten lead from being drawn into the vacuum source 15. The location of a cold spot or cold spots will vary depending on the shape and size of the casting. For any particular shape battery casting, one can generally determine the cold spots by determining the regions of the mold that are less massive than others. If needed, one can also determine the cold spot through trial and error.

In addition to the position of a vacuum passage in mold 11, one places a pressure probe 17 on the surface boundary of the battery mold cavity 20 in order to determine when the molten lead is in the liquid-to-solid transformation stage. While the temperature could be measured to determine when the lead reaches the liquid-to-solid transformation stage, the time lag between the actual temperature of the lead and the measured temperature may be sufficiently long so that the actual temperature of the molten lead may have cooled sufficiently so the lead is no longer in the liquid-to-solid transformation stage even though the temperature probe indicates that the temperature of the lead is in the liquid-to-solid transformation stage. However, by measuring the pressure using a pressure probe, one is able to obtain a pressure reading which can more quickly determine when the molten lead enters the liquid-to-solid transformation stage. By being able to more quickly determine the molten state of the lead, one still has sufficient time to active the piston driver 13 to drive the piston 23 into the molten lead and force the molten lead to flow into a reduced volume before the molten lead passes completely through the liquid-to-solid transformation stage.

With the system 10 in the condition shown in FIG. 1, the control unit 14 can activate the molten lead supply to deliver molten lead under pressures of 40,000 psi or higher to deliver molten lead to pipe 22 which delivers the molten lead under pressure to runner 24. The molten lead flows in the directions indicated by the arrows in runners 24 and 25. Note, in this condition piston 23 is located behind runner 24 so that molten lead flows from runner 24 to runner 25 and into battery terminal cavity 20. While the molten lead is flowing into battery terminal cavity 20, the vacuum source is removing air from battery terminal cavity 20 with the air flowing through vacuum source 15 as indicated by arrow in conduit 21. As previously mentioned, air evacuation conduit 21 terminates at a cold spot indicated by reference numeral 29 while the molten lead enter battery terminal cavity at what is considered a hot spot 28, i.e. an area where the lead solidifies last.

Once the molten lead enters the battery terminal cavity 20, the molten lead fills up the battery terminal cavity and the lead in the cold spot 29 begins to solidify thereby preventing further molten lead from being drawn out of the mold and into conduit 21. It should be pointed out that the size of the opening in the cold spot is kept sufficiently small so that the molten lead will solidify and quickly fill the open end of conduit 21, yet the conduit 21 is sufficiently large so that the air can quickly be evacuated from the battery terminal cavity 20.

As the vacuum passage 21 is sealed off, the pressure in the battery terminal cavity 20 begins to rise under the pressure of the molten lead supply. When the pressure reaches a predetermined level, which can be determined by the shape and size of the battery terminal being cast, the control unit 14 senses the pressure and sends a signal to piston driver 13. Piston driver 13 includes a quick action hydraulic cylinder or the like which quickly fires piston 23 foreword, which simultaneously cuts off the supply of additional molten lead from runner 24, while reducing the volume in which the lead will solidify.

If desired, the decrease in volume can be determined based on trial and error. That is, by observing the finished product for cracks and tears, one can determine if more volume reduction is necessary as insufficient volume reduction of the lead or lead alloy leaves cracks and tears in the finished battery terminal.

Figure 3:
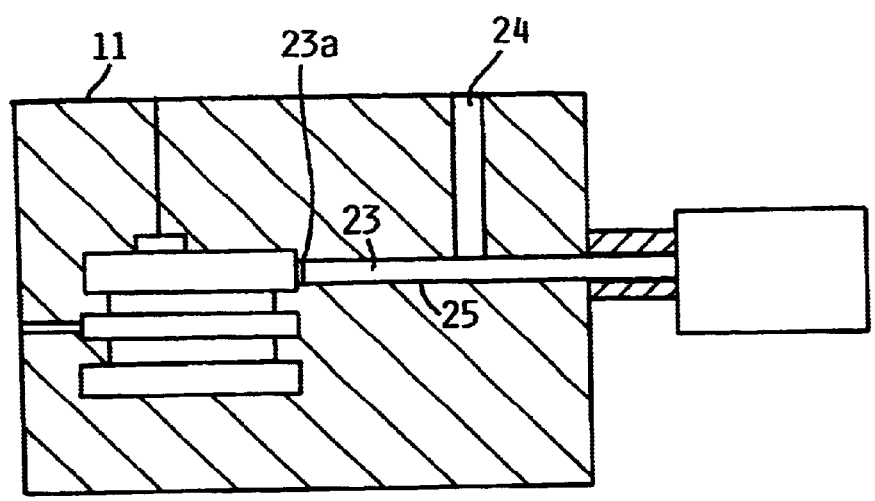
FIG. 3 shows a portion of the system of FIG. 1 with the piston in the extended position that produces a reduced volume for the solidification of a lead or lead alloy.

FIG. 3 shows a portion of system 10 with mold 11. In the condition shown in FIG. 3 the piston 23 has been driven into the passage 25 thereby cutting off the flow of additional molten lead through runner 24. At the same time the end of piston 23 has forced the molten lead in passage 25 into the mold by pushing the molten lead ahead of end 23a of piston 23. Thus the volume for molten lead to solidify therein has been decreased by forcing the piston end 23a proximate the battery terminal cavity 20. In the preferred method, the piston end 23a is driven to the outer confines of the battery terminal cavity 20 thereby eliminating a protrusion on the battery casting. That is, the end 23a, when in the piston shown in FIG. 3 defines the end of a portion of the battery terminal being cast therein.

Figure 4:
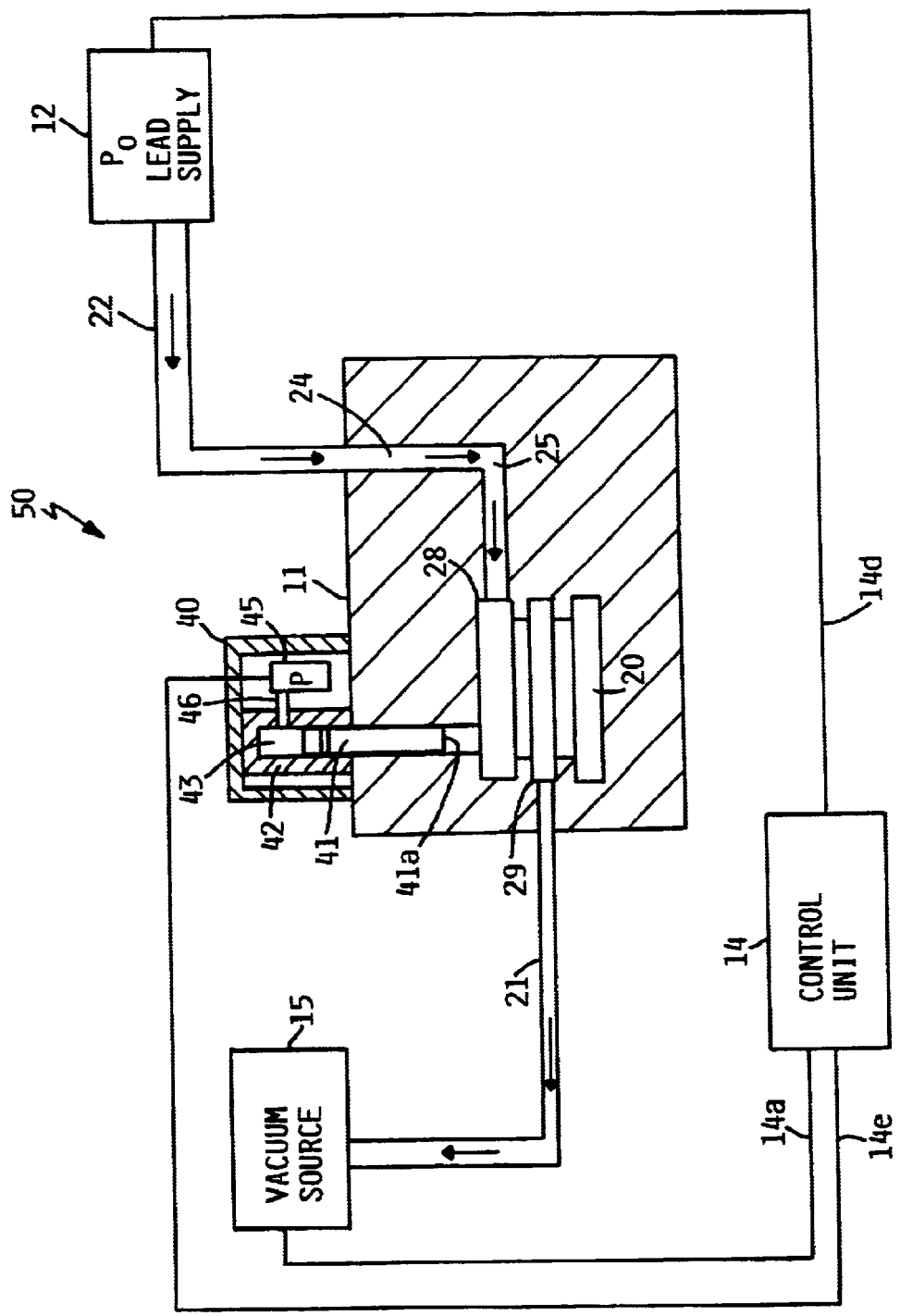
FIG. 4 shows an alternate system wherein a piston is maintained under pressure during the casting process.

FIG. 4 shows an alternate embodiment of my system that uses an external piston 41 that is maintained under a predetermined pressure. The components of system 50 that are identical to the components in system 10 are shown with identical numbers. System 50 includes a housing 40 which is secured to mold 11. Housing 40 includes a cylinder 42 that has a slidable piston 41 located therein. A chamber 43 is located above the top end of piston 41. A high pressure source 45 connects to chamber 43 though conduit 46. The control for high pressure 45 source comes from control unit 14 and through lead 14c. Piston 41 is shown in the slightly elevated condition and during the course of its operation the lower end 41a of piston 41 will move from a position flush with the surface of the battery terminal casting 20 to a position above the battery terminal casting 20 (shown in FIG. 4) and eventually again to a position where end 41a is flush with the surface of the lead battery terminal casting 20.

In the embodiment shown in FIG. 4, the piston 41 is positioned in a hot spot in the mold. The lead is then injected under pressure into mold 28 though runner 24. During this stage of the molding process the injection pressure of the lead builds to a level where the pressure of the lead in the mold is sufficient to force piston 41 upward as shown in FIG. 4. As the mold begins to cool and the supply of lead to the battery terminal cavity is terminated, the pressure in the battery terminal cavity 20 begins to decrease. As the pressure in the mold decreases, it reaches a point where the pressure forces on the top end of piston 41 become greater than the pressure forces on the bottom end 41a of piston 41. In this condition piston 41 is driven downward by the pressurized air in chamber 43 causing the volume available for the lead to solidify in to be reduced. As long as the piston 41 is located in a hot spot on the mold, the lead is forced into a smaller volume as it solidifies. Consequently, the reduction of volume causes the battery casting formed therefrom to be formed substantially free of cracks. If desired, one can ensure that the lead does not solidify in the area where the piston contacts the molten the piston by maintaining a temperature of the piston in excess of the molten lead in the mold.

Figure 5:
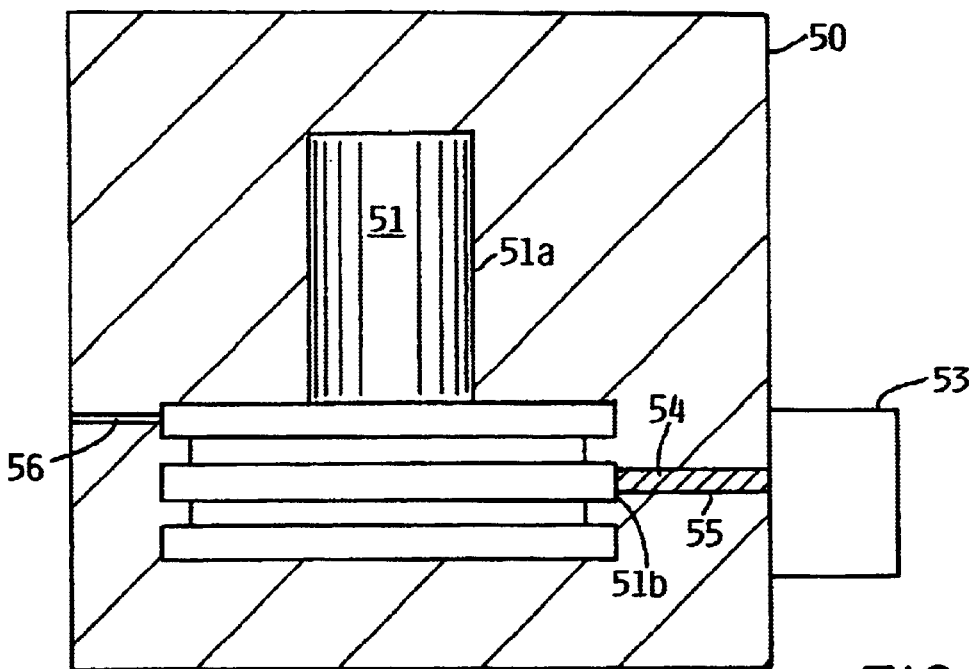
FIG. 5 is a cross-sectional view showing a portion of a mold and a piston that is positioned having its end surface at the end surface of the mold cavity during the pressure casting process.

FIG. 5 is a cross-sectional view showing a portion of a mold 50 in cross section. A battery terminal cavity 51 is shown therein having an upper cylindrical electrical contact surface 51a and a lower non-electrical contact surface 51b. The electrical contact surface is defined as the surface of the battery terminal that is mechanically clamped to a battery cable to transmit electrical energy from the battery terminal to the battery cable. The non-electrical contact surface 51b is the surface of the battery terminal that is either connected to the battery casing, remains free of contact with another part or is fused to another battery part. Generally, the electrical contact surface should have a smooth and continuous finish for mechanically engaging a battery clamp thereto while smoothness and continuous of the non-electrical contact surface is less critical because there are no mechanical connections thereto. Mold 50 includes a blow hole or vent passage 56 for removing air from the battery mold cavity. Depending upon the conditions of molding, a vacuum source could be connected thereto to remove air more rapidly. A cylindrical piston 54 is positioned in a cylindrical passage with the piston 54 having an end source 51b flush with the surface of the non-electrical contact surface of the mold cavity during the pressure casting process. A piston driver 53 is positioned proximate the mold 50 and includes therein means (not shown) for driving the piston 54 toward the battery terminal cavity 51 or for retracting the piston 54 away from the battery terminal cavity.

Figure 6:
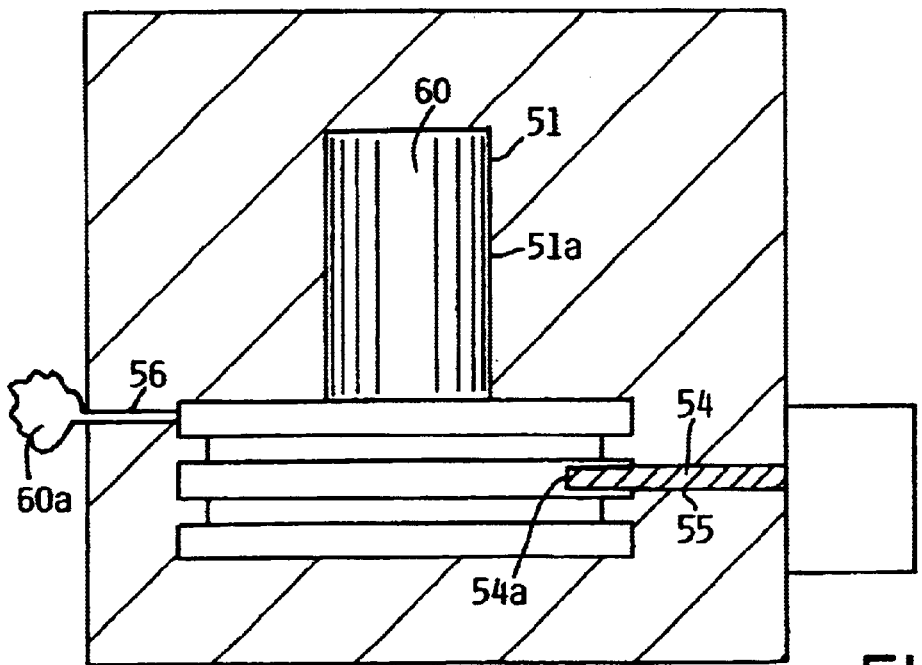
FIG. 6 is a cross-sectional view of FIG. 5 showing the piston driven into the battery terminal to deform the metal into a shape free of cracks and tears.

FIG. 6 is a cross-sectional view of the mold in FIG. 5 showing a solidified battery terminal 60 located in battery cavity 51. The piston 54 has been driven into the solidified battery terminal 60 with sufficient force so as to at least partially cold form the solidified lead into a battery terminal which is free of cracks and tears. That is, the end of piston 54a is shown penetrating into the batter terminal to decrease the volume of the battery terminal cavity while at the same time mechanically deforming at a least a portion of the battery terminal 60 located therein. In the embodiment shown, the mechanical pressure is sufficient to force solidified lead through passage 56 and out of mold 50 as indicated by solidified lead 60a extending from vent passage 56. Thus, one can pressure cast a battery part and allow the pressure cast battery part to solidify and while the battery part is still in the mold but in the solidified state a piston can be driven into the solidified part to mechanically deform the lead which will remove cracks or tears in the battery terminal that occur as a result of the pressure casting process. FIG. 6 shows that the piston can be driven into the battery terminal 60 to leave a recess within the battery terminal. As the piston is driven into the portion of the battery terminal that contains the nonelectrical contact surface, a feature such as a recess can be tolerated thereon without adverse conditions for operation of the battery terminal. This procedure of volume contraction is suitable when the battery part has a shape so that the volume contraction can cause the deformation of the lead in remote portions of the battery part. That is, in some battery parts the configuration of the battery part may be such that a volume reduction in one region produces only partial cold deformation or reworking the battery part thereby leaving a battery part with a crack or tear. However, in those battery parts where the cold deformation can effectively move metal throughout the battery cavity the volume contraction can be performed after the solidification of the battery part. The advantage of this method is that the internal pressure within the mold is increased locally but not throughout the mold as the solidified battery part does not transmit pressure forces in the same manner as if it were a liquid.

Figure 7:
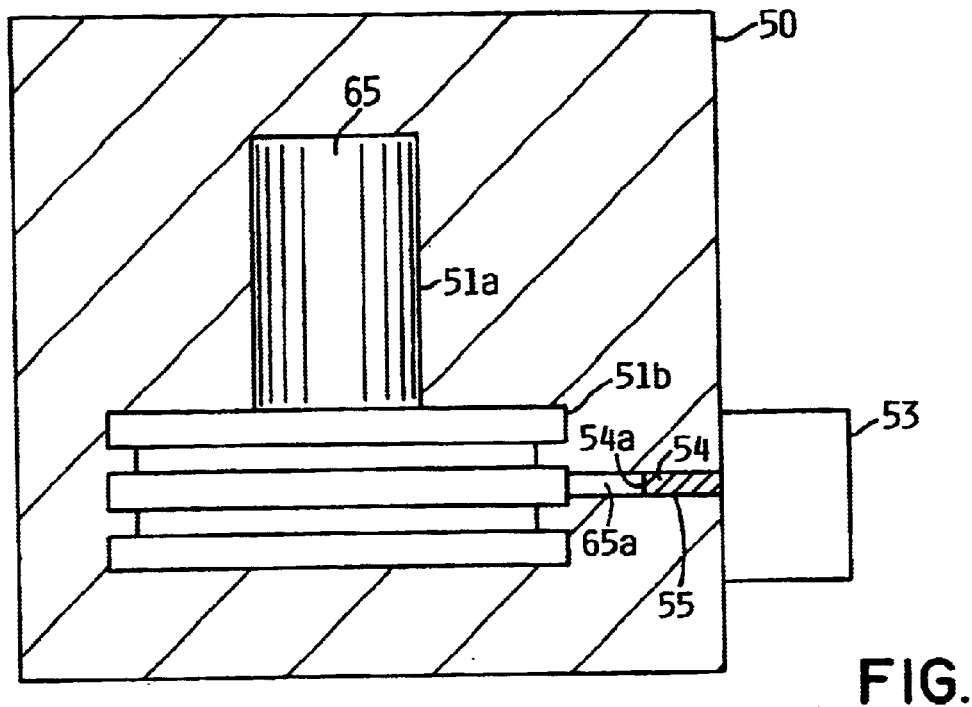
FIG. 7 is a cross-sectional view showing a portion of a mold and a piston that is positioned having its end surface spaced from the end surface of the mold cavity during the pressure casting process.

FIG. 7 is a cross-sectional view showing a portion of a mold 50 and a piston 54 that is positioned having its end surface 54a spaced from the non-electrical contact surface 51b. A pressure cast solidified battery terminal 65 is shown therein with a solidified extension 65a extending outward from the battery terminal 65 to the end surface 54a of piston 54. In this condition, the extension 65a has solidified as an integral part of the battery terminal. Battery terminal 65 having been formed by a pressure cast process can include cracks and tears. In order to remove any tears or cracks the piston 54 is driven toward battery terminal post 65 with sufficient force to force the material in extension 65a into the battery terminal and thereby mechanically deform the battery terminal to a condition wherein the tears and cracks are removed.

Figure 8:
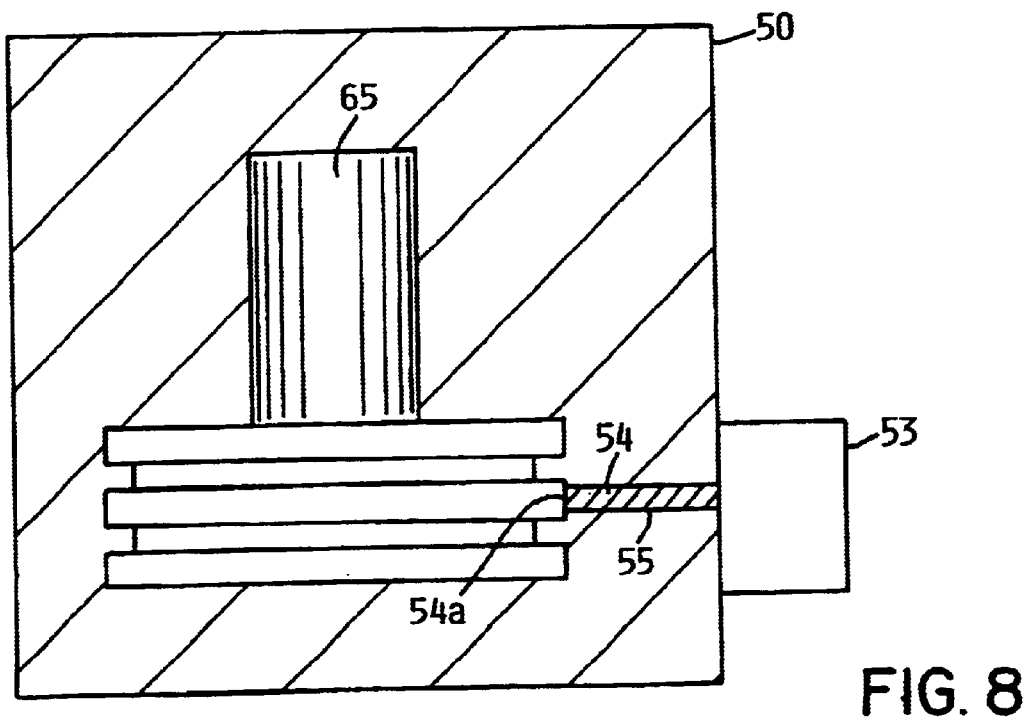
FIG. 8 is a cross-sectional view of FIG. 7 showing the end of the piston driven up to the end surface of the mold cavity to deform the metal into a shape free of cracks and tears.

FIG. 8 illustrates the driving of the piston to a condition flush with the surface of the battery terminal. By driving the piston end 54a to a condition flush with the battery terminal 65, the battery terminal is provided with a continuous surface. Consequently, the method illustrated by FIG. 8 can be used on either the non-electrical contact surface or the electrical contact surface as the finished surface remains flush with the adjacent surface.

Figure 9:
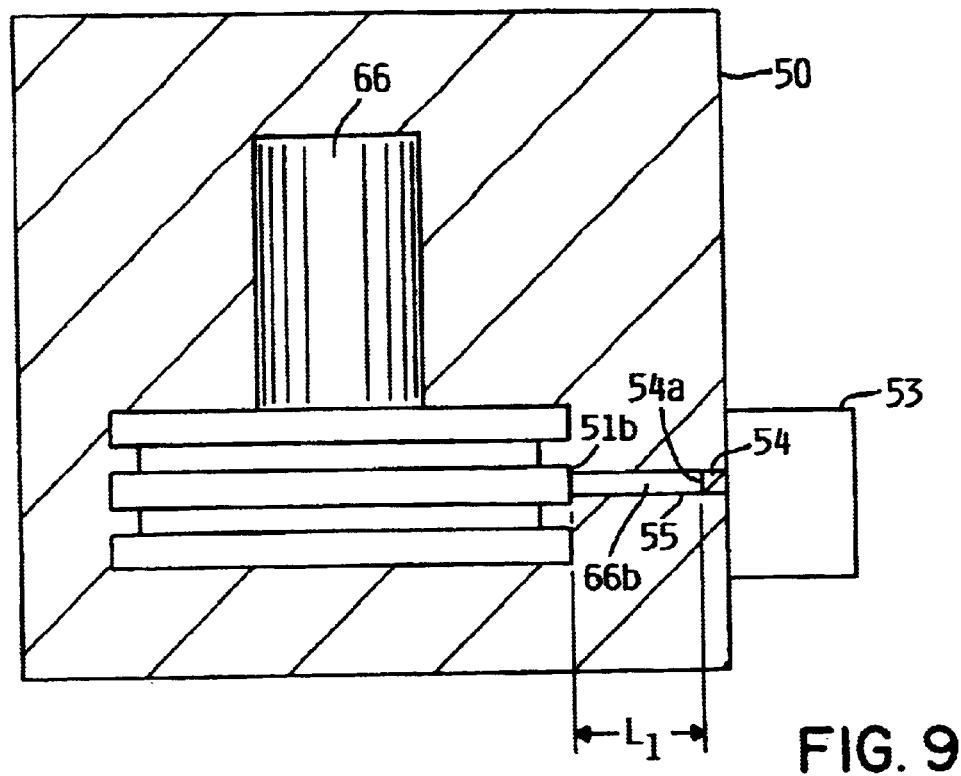
FIG. 9 is a cross-sectional view showing a portion of a mold and a piston that is positioned having its end surface spaced from the end surface of the mold cavity during the pressure casting process.

FIG. 9 is a cross-sectional view showing a portion of a mold 55 with a solidified battery terminal 66 therein. A piston 54 is positioned having its end surface 54a spaced from the mold cavity end surface 51b. In the condition shown, a solidified cylindrical extension of length $L_1$ extends from battery terminal 66.

Figure 10:
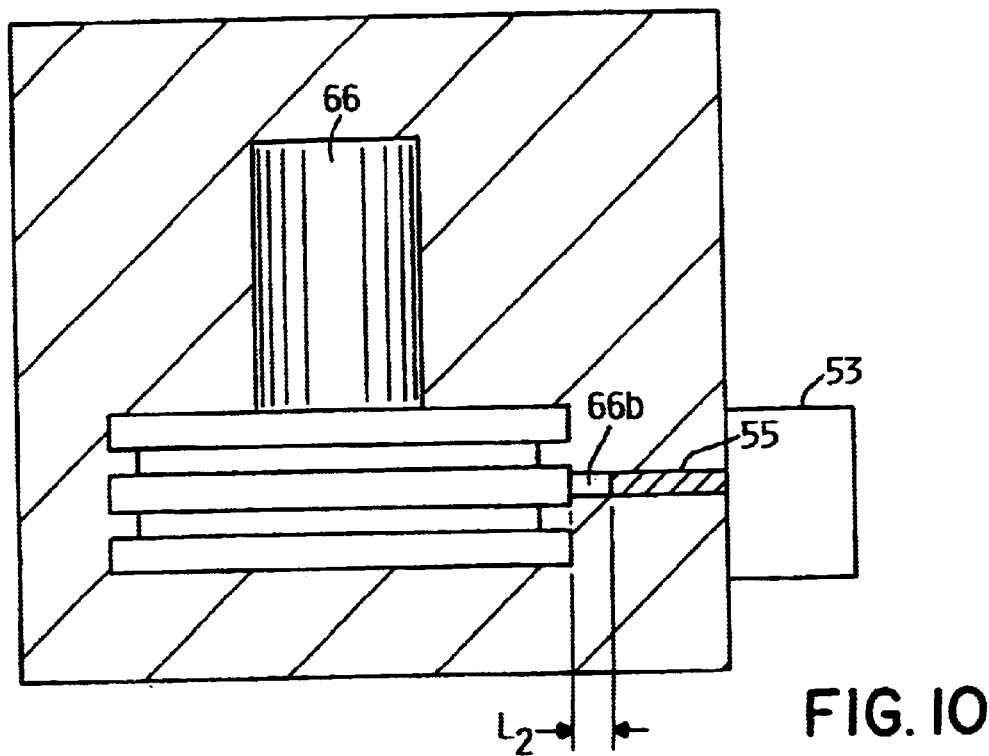
FIG. 10 is a cross-sectional view of FIG. 9 showing the end of the piston driven to a condition spaced from the end surface of the mold cavity to deform the metal into a shape free of cracks and tears.

FIG. 10 is a cross-sectional view of the mold in FIG. 9 showing the end of the piston driven to a condition which is also spaced from the end surface of the mold cavity. That is the piston has been driven in passage 55 until the extension 66b has been shortened to length L2. The purpose of mechanically reducing the volume of the solidified battery terminal 66 is to cold form at least a portion of the metal in the battery terminal to thereby relieve any cracks or tears in the pressure cast battery terminal. The method illustrated in FIGS. 9 and 10 requires less precession in the piston movement to deform the metal into a shape free of cracks and tears. For example, the amount of force applied to piston 53 could be the determining factor of the travel of the piston rather than the length of piston travel determining the pressure of deformation on the battery terminal.

Figure 11:
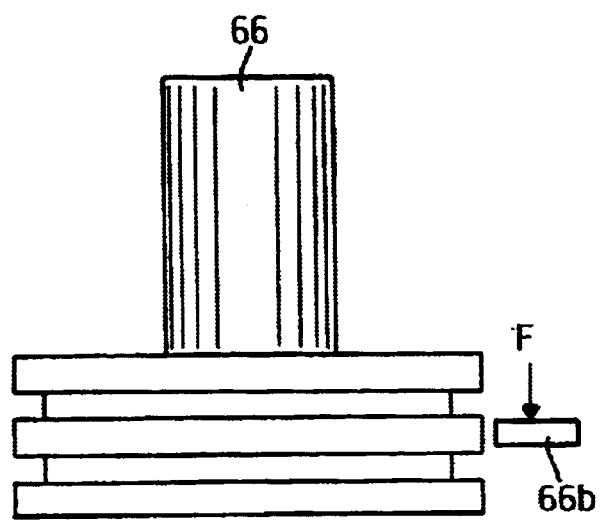
FIG. 11 is a view of a battery terminal of FIG. 10 with the pressure cast extension being sheared off.

FIG. 11 is a view of a battery terminal of FIG. 10 with the pressure cast extension 66b being schematically shown as being sheared off. In practice the removal of the battery terminal 66 from the mold may cause the extension 66b to shear off and remain in cylindrical passage 55. That is, the extension 66b is sufficiently small in diameter so that the extension can be broken with the battery terminal removal force.

Figure 12:
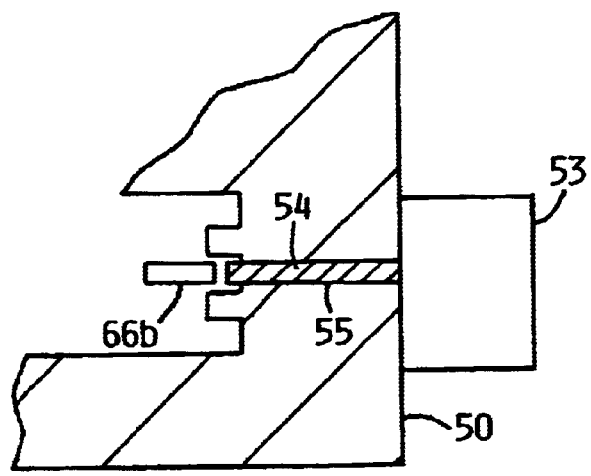
FIG. 12 is a partial cross-sectional view of the piston of FIG. 10 driving the sheared pressure cast extension from the mold cavity.

To illustrate the removal of the extension 66b from the mold, reference should be made to FIG. 12 which is a partial cross-sectional view of the piston of FIG. 10. Piston 53 is shown driving the pressure cast extension 66b from the passage 55. Thus with the method illustrated in FIGS. 9–12 one can leave an extension on the cast battery terminal and then break the extension off during the removal of the battery terminal. The use of the piston 54 allows one to clear the passage 55 for the next casting.

Thus FIGS. 1–12 illustrate different methods for pressure intensification wherein an external piston is driven into either a runner or the mold cavity to reduce the volume of the mold cavity. FIG. 13 shows the improved system 79 for pressure casting of a battery terminal to inhibit the formation of cracks and tears in the pressure casting of battery terminals wherein the actual finished internal surface of the mold is displaced to contract the volume of the mold cavity. The system 79 comprises a first mold member 80 having a cavity 85 therein which contains lead 86. Mold member 80 is shown as a single member; however, mold member 80 could be formed of multiple parts in order to provide for ease in manufacture as well as removal of the part from the mold. Located within mold member 80 is a displaceable mold member or displaceable core 81 which extends into the mold member 80 and coact therewith to form the battery part cavity 85 of a first volume. That is the exterior surface on section 81b forms a substantial part of the finished surface for the mold cavity 85. Core member 81 is shown to comprise a first cylindrical section 81 of diameter $D_2$, a second tapered or frusto conical section 81b that decreases from diameter $D_2$ to diameter $D_1$ and a further section of diameter $D_1$. In the position shown in FIG. 13 the internal peripheral finished surface 81b on the displaceable mold member 81 and the internal finished surface 85a in mold member 80 coact to from an internal battery part cavity 85 of a first volume. That is, mold member 81 extends upward into mold member 80 to coact with mold member 80 to form a finished battery part cavity 85.

As the mold member 81 contains an enlarged section 81a an axial extension of member 81 upward into mold member 80 brings the large portion of member 81 upward into the mold member 80 thereby coactively reducing the volume of the cavity 85 formed by the two mold members without disrupting a surface on the finished battery part.

In operation, system 79 can includes a power source 83, such as a hydraulic cylinder 83 with an extendible rod 84 for displacing displaceable mold member 81.

FIG. 13 illustrates the condition wherein the two mold members 80 and 81 are positioned to form a first finished battery part cavity 85 of a first volume $V_1$ and FIG. 14 illustrates the two mold members 80 and 81 displaced with respect to each other to form the second finished battery part cavity of a second volume $V_2$ wherein the second volume is less than the first volume to thereby intensify the pressure of a battery part in the battery part cavity to thereby to thereby produce a pressure cast battery terminal substantially free of cracks and tears.

FIG. 14 shows rod 84 extended upward to force displaceable core member 81 further into mold member 80 to thereby cause the tapered section 81b, which forms part of the finished battery part cavity, to move further upward thus reducing the volume of cavity 85 to a second volume $V_2$ wherein $V_2$ is less than $V_1$ so that when the lead part is removed the part has been intensified to inhibit cracks and tears. Thus the present invention provides for on-the-go reduction of the volume of a battery part by displacing at least one of the mold members that form the sidewalls of the finished battery part cavity thereby maintaining the integrity of the finished cast part.

A supply of molten lead can be supplied to the mold cavity through a shut off valve 88 and runner 89. By having a shut off valve one can isolate the rest of the supply system from high pressures if the mold member 81 is displaced with respect to mold member 80 when the lead is in a molten state.

What is claimed is:

1. A system for pressure casting of a battery part to inhibit the formation of cracks and tears in the pressure casting of battery parts comprising:

a mold member, said mold member carrying a portion of an internal mold cavity surface therein;

a displaceable mold member, said displaceable mold member carrying a further portion of an internal mold cavity thereon with said displaceable mold member coacting with said mold member to form an internal battery part cavity of a first volume; and a power source for displacing said displaceable mold member into said mold member to form the battery part cavity of a first volume into a battery part cavity of a second volume, said second volume less than said first volume to thereby intensify the pressure of a battery part in the battery part cavity to thereby to thereby produce a pressure cast battery part substantially free of cracks and tears.

2. The system of claim 1 wherein a supply of molten lead is cut off from the battery cavity before reducing the first volume of the battery part cavity.

3. The system of claim 1 wherein the lead is in a molten state when the first volume of the battery part cavity is reduced.

4. The system of claim 1 wherein the lead is in a liquid-to-solid transformation stage state when the first volume of the battery part cavity is reduced.

5. The system of claim 1 wherein the lead is in a solid state when the first volume of the battery part cavity is reduced.

6. The system of claim 1 wherein the displaceable mold members has a finished surface for forming the battery part cavity.

7. The system of claim 6 wherein the mold member has a frusto conical surface.

8. The system of claim 1 including a hydraulic cylinder.

9. The system of claim 1 wherein the mold members forms a continuous portion of the battery part cavity so that the battery part cast therein is remove it requires no further finishing.

10. The system of claim 1 wherein the molten lead is a lead alloy.

11. The method of pressure casting a lead battery terminal to inhibit the formation of cracks and tears in the battery terminal comprising the steps of:

forming a battery terminal cavity of a first volume between a mold member and a displaceable core member;

injecting molten lead under pressure into the battery terminal cavity; and reducing the first volume of the battery terminal cavity by displacing the displaceable core member with respect to the mold member to thereby reduce the first volume to a second volume lesser than said first volume but sufficient to inhibit the formation of cracks and tears in the battery terminal.

12. The method of pressure casting of claim 11 including the step of monitoring the temperature of the metal in the mold before reducing the first volume to the second volume.

13. A method for pressure casting and partial cold forming a battery part free of cracks and tears comprising:

forming an integral battery part cavity of a first volume through coaction of a fixed mold member and a displaceable mold member;

injecting lead under pressure into the battery part cavity formed by the fixed mold member and the displaceable mold member;

driving the displaceable mold member with sufficient force so as to reduce the first volume of the battery part cavity to a second volume lesser than said first volume to thereby inhibit any cracks or tears from a solidified battery part formed therein.

14. The method of forming a pressure cast battery part free of cracks and voids comprising the steps of:

introducing a molten lead under pressure to a battery part cavity formed by at least two mold members at least one of which is displaceable with respect to the other;

sealing off the battery part cavity while the battery part cavity contains molten lead to thereby form a closed volume for the molten lead; and increasing the pressure of the molten lead in the battery part cavity by displacing at least one of the at least two mold members to thereby internally reduce the volume of the mold cavity and thereby create sufficiently high pressure so that when the molten lead solidifies it forms a battery part free of cracks and voids.

* * * * *